US010650318B2

United States Patent
Xie et al.

(10) Patent No.: US 10,650,318 B2
(45) Date of Patent: May 12, 2020

(54) SYSTEMS AND METHODS OF DETERMINING SUFFICIENT CAUSES FROM MULTIPLE OUTCOMES

(71) Applicant: Baidu USA, LLC, Sunnyvale, CA (US)

(72) Inventors: Yusheng Xie, Campbell, CA (US); Nan Du, Palo Alto, CA (US); Jing Zhai, Mountain View, CA (US); Weicheng Zhu, Sunnyvale, CA (US); Dawen Zhou, Fremont, CA (US); Wei Fan, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 639 days.

(21) Appl. No.: 15/215,513

(22) Filed: Jul. 20, 2016

(65) Prior Publication Data

US 2018/0025282 A1 Jan. 25, 2018

(51) Int. Cl.
*G06N 7/00* (2006.01)

(52) U.S. Cl.
CPC .................................. *G06N 7/005* (2013.01)

(58) Field of Classification Search
CPC ........ G06N 7/005; G06F 19/345; G06F 17/14
See application file for complete search history.

(56) References Cited

U.S. PATENT DOCUMENTS

| 7,610,313 | B2 | 10/2009 | Kawai | |
|---|---|---|---|---|
| 2001/0014868 | A1 | 8/2001 | Herz | |
| 2001/0044795 | A1 | 11/2001 | Cohen | |
| 2003/0037034 | A1 | 2/2003 | Daniels | |
| 2004/0093331 | A1 | 5/2004 | Garner | |
| 2004/0243548 | A1* | 12/2004 | Hulten | G06N 7/005 |
| 2005/0055357 | A1 | 3/2005 | Campbell | |
| 2008/0147441 | A1* | 6/2008 | Kil | G06Q 40/08 705/2 |
| 2012/0136853 | A1 | 5/2012 | Kennedy | |
| 2014/0101219 | A1* | 4/2014 | Tang | G06F 17/142 708/403 |
| 2014/0201126 | A1 | 7/2014 | Zadeh | |

(Continued)

OTHER PUBLICATIONS

Guo et al. "A Survey of Algorithms for Real-Time Bayesian Network Inference", 2002, AAAI Technical Report, pp. 1-12. (Year: 2002).*

(Continued)

*Primary Examiner* — Hien D Khuu
(74) *Attorney, Agent, or Firm* — North Weber & Baugh LLP

(57) ABSTRACT

Systems and methods are disclosed for question generation to infer the most probable cause from the observable outcome and known Noisy-OR causal relations. In embodiments, the outcomes are sorted by indices according to an order including but not limited to the outcomes' natural frequency order, expert-labeled order, machine-learning derived order, etc. According to their assigned indices, in embodiments, observed outcomes with lower indices are assigned for exact inference while observed outcomes with higher indices are assigned for variational inference. In embodiments, results of exact inference and variational inference are combined to predict the most probable cause. The unique combination of exact inference and variational inference according to outcome indices makes the probable cause inferring process faster.

20 Claims, 4 Drawing Sheets

(56) References Cited

U.S. PATENT DOCUMENTS

| | | | |
|---|---|---|---|
| 2015/0006492 A1 | 1/2015 | Wexler | |
| 2015/0012472 A1* | 1/2015 | Liang | G06N 5/043 706/20 |
| 2015/0350149 A1 | 12/2015 | Acharya | |
| 2016/0078184 A1* | 3/2016 | Konerman | G06F 19/00 706/12 |
| 2016/0085608 A1* | 3/2016 | Bovey | G05B 23/0278 714/37 |
| 2016/0253370 A1 | 9/2016 | Song | |
| 2016/0379229 A1 | 12/2016 | Akkiraju | |
| 2017/0011303 A1 | 1/2017 | Annapureddy | |
| 2017/0344899 A1 | 11/2017 | Zimmerman | |

OTHER PUBLICATIONS

Frey et al. "Sequentially fitting "inclusive" trees for inference in noisy-OR networks", 2001, MIT Press, pp. 493-499. (Year: 2001).*
Pearl, "Probabilistic Reasoning in Intelligent Systems",1988, (10 pgs).
Heckerman, "A Tractable Inference Algorithm for Diagnosing Multiple Diseases", 1990, (9 pgs).
Jaakkola et al., "Variational Probabilistic Inference and the QMR-DT Network", 1999, (32 pgs).
Murphy et al.,"Loopy Belief Propagation for Approximate Inference", 1999, (9 pgs).
Ng et al.,"Approximate inference algorithms for two-layer Bayesian networks", 2000, (7 pgs).
Jernite et al., "Discovering Hidden Variables in Noisy-Or Networks using Quartet Tests", 2013, (9 pgs).
Halpern et al., "Unsupervised Learning of Noisy-Or Bayesian Networks", 2013, (10pgs).
Non-Final Office Action dated Oct. 17, 2018, in U.S. Appl. No. 15/207,434, (26 pgs).
Response filed Jan. 17, 2019, in U.S. Appl. No. 15/207,434, (17 pgs).
J. A. Bullinaria, "Recurrent neural networks", in Lecture on Neural Computation, 2015 (20 pgs).
Hochreiter et al., "Long short-term memory", Neural computation, 9(8):1735-1780, 1997, (32 pgs).
Lipton et al., "A critical review of recurrent neural networks for sequence learning", arXiv preprint arXiv:1506.00019, 2015, (38 pgs).
Notice of Allowance and Fee Due, dated May 15, 2019, in U.S. Appl. No. 15/207,434 (8 pgs).
Notice of Allowance and Fee Due, dated Sep. 5, 2019, in U.S. Appl. No. 15/207,434 (8 pgs).
Non-Final Office Action dated Sep. 26, 2019, in U.S. Appl. No. 15/205,798, (18 pgs).
Response filed Dec. 13, 2019, in related U.S. Appl. No. 15/205,798. (9 pgs).
Notice of Allowance and Fee Due dated Jan. 10, 2020, in related U.S. Appl. No. 15/205,798. (8 pgs).

* cited by examiner

SYSTEMS AND METHODS OF DETERMINING SUFFICIENT CAUSES FROM MULTIPLE OUTCOMES

A. TECHNICAL FIELD

The present disclosure relates generally to providing systems and methods to aid in determining potential causes given multiple outcomes.

B. BACKGROUND

Causality is the principal that there is a relationship between a cause and an effect or outcome. In some situations, an outcome may have been the result of one of many causes. Various models and theories exists that try to formalize causal relationships. One such set of models is referred to as the independence of causal influences (ICI), which addresses the issue of exponential growth of parameters when dealing with conditional probabilities by making the assumption of independence of causal influences (ICI). Accepting this assumption allows for parametric models that define conditional probability distributions using only a number of parameters that is linear in the number of causes.

ICI models, such as the Noisy-OR and the Noisy-AND gates, have been widely used. Noisy-OR model is a causal independence formalism that models relationship between a number of causes and an outcome, where each cause is sufficient for resulting in the outcome. The "noisy" modifier emphasizes that any causal relationship is, above all, probabilistic. Noisy-AND model is a causal independence formalism that models relationship between a number of causes and an outcome, where each cause is necessary for resulting in the outcome.

Noisy-OR maybe illustrated using equation $Pr(o)=1-[(1-leak)\Pi(1-p_i)]$, where $p_i$ is the probability of cause i causing outcome o; and leak is the probability of observing outcome o without any causes causing it. Noisy-AND maybe illustrated using equation $Pr(o)=(1-inhibit)\Pi(1-p_i)$, where $p_i$ is the probability of cause i causing outcome o; and inhibit is the probability of not observing outcome o with all the required causes.

In real life, many Noisy-OR events may overlap. The sufficient causes for outcome A may overlap with those for outcome B. For example, in Quick Medical Reference-Decision Theoretic (QMR-DT), which is a medical decision-support system that is based on the comprehensive Quick Medical Reference (QMR) knowledge base, pneumonia and flu are both sufficient causes for the observable outcome fever. If a patient describes a fever symptom, the question then becomes, "How do medical practitioners determine if the patient has pneumonia or flu or something else?" Or, in a different context, using an alarm system as an example, a wandering stray cat and an actual break-in burglary are both sufficient conditions to trigger the alarm; therefore, a question may be asked, "How does one determine whether this is a false alarm?"

Therefore, there is a need for systems and methods to infer the most probable cause from one or more observable outcomes and causal relations.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. ("FIG.") 1 shows a Noisy-OR model with outcome ordering indexes according to embodiments of the present disclosure.

DETAILED DESCRIPTION OF THE PREFERRED EMBODIMENTS

Figure 1:
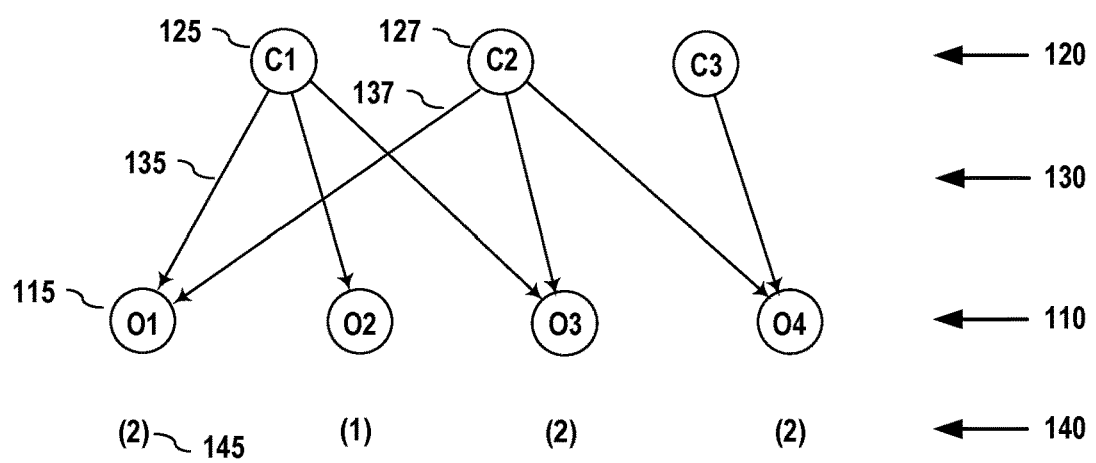

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

FIG. 1 depicts a sample Noisy-OR model with an outcome ordering index according to embodiments of the present disclosure. In embodiments, the Noisy-OR model comprises a plurality of observed outcomes 110. Each outcome may be caused 130 by one or more causes 120 with each cause being sufficient for resulting in the outcome. The "noisy" modifier emphasizes that any causal relationship is probabilistic. Given the observed outcomes, the probability of one cause is independent from other causes. The relationship 130 between each outcome 110 and the associated cause 120 may be obtained from a knowledge graph. In embodiments, the knowledge graph may be a standalone component used by or to generate a Noisy-OR model 100 or may be an integrated part of the Noisy-OR model. Examples of systems and methods for generating the knowledge graph, are found in co-pending and commonly-owned U.S. patent application Ser. No. 15/205,798, filed on Jul. 8, 2016, entitled "SYSTEMS AND METHODS FOR RELATION INFERENCE" and listing Chaochun Liu, Nan Du, Shulong Tan, Hongliang Fei, Wei Fan as inventors, and U.S. patent application Ser. No. 15/207,434, filed on Jul. 11, 2016, entitled "SYSTEMS AND METHODS FOR DATA AND INFORMATION SOURCE RELIABILITY ESTIMATION," and listing Yaliang Li, Nan Du, Yusheng Xie, and Wei Fan as inventors, which patent documents are incorporated by reference herein in its entirety and for all purposes. The Noisy-OR model may also comprise input interface for a user to input observed outcomes 110.

In embodiments, the observed outcomes 110 have one or more indices 140 or categorizes associated with it. Typically, outcomes are order-less; however, in embodiments, indices may be assigned according to an ordering, which may include but is not limited to the outcomes' natural frequency order, expert-labeled order, machine-learning derived order, etc. Consider, by way of illustration, the example 100 depicted in FIG. 1. As shown in FIG. 1, the index "2" (e.g., 145) assigned to an outcome (e.g., outcome $O_1$ 115) may be based upon the number of connections to causes. Since outcome $O_1$ 115 is causally connected (illustrated by connections 135 and 137) to two causes, cause $C_1$ 125 and cause $C_2$ 127, the index for this outcome is 2. Likewise, the outcomes index would be 1 for outcomes having one cause, 3 for outcomes having three causes, and so forth. It is understood that FIG. 1 is only for illustration purpose only and other approaches may be used.

In embodiments, the observed outcomes 110 may be symptoms related to diseases. The model receives the observed symptoms (outcomes) and may output a set of one or more of the most probable diseases that may have caused the observed symptoms and/or may output the index related to the outcome. In embodiments, the model may be used for developing medical diagnosis artificial intelligence but may be used in other contexts as well. For example, in embodiments, the model may also be used in the event of extremely large amount of causal signals, like the stock market, for quick and correct action. It should be noted that as the number of potential causes increases, the number of outcomes increase, or both, the complexity of ascertaining likely causes becomes vastly too complex for a human to determine without assistance.

Figure 2:
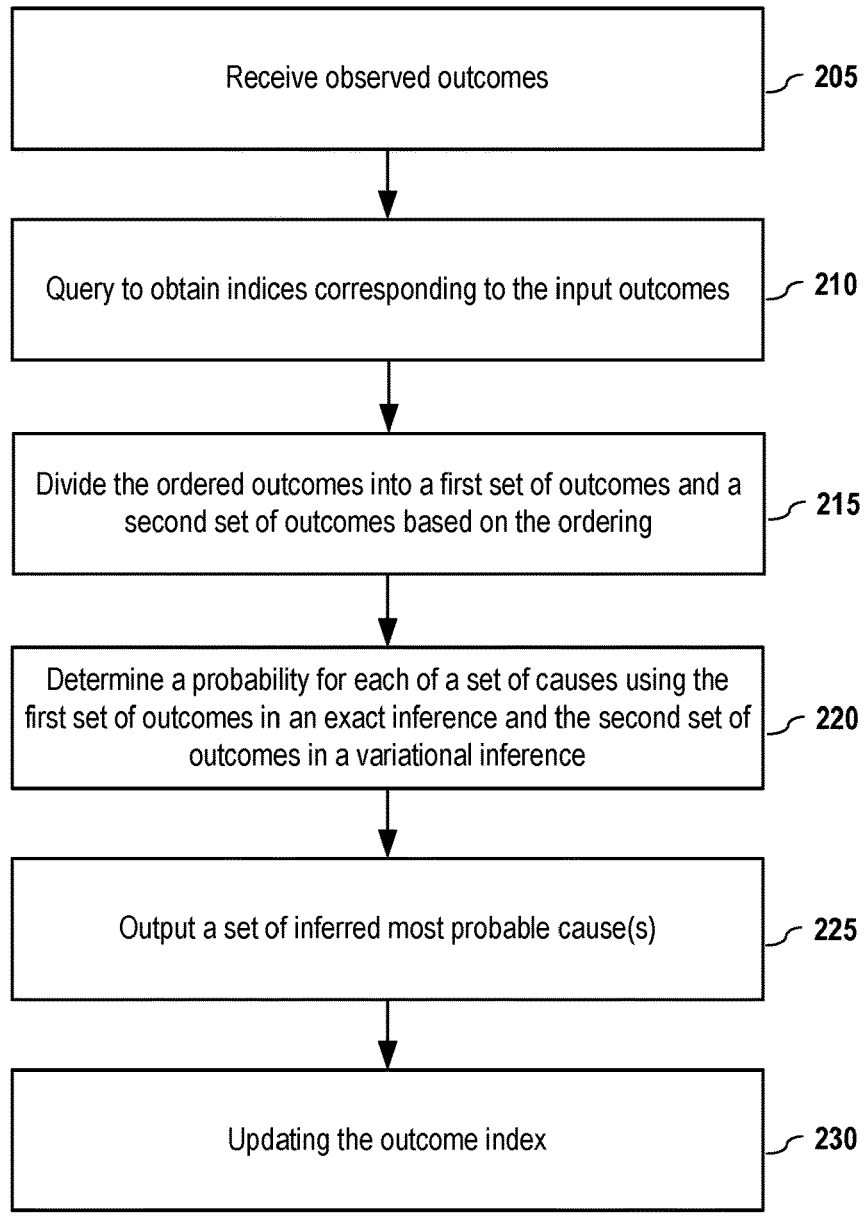
FIG. 2 illustrates a general flow diagram for inferring the most probable cause from observable outcomes according to embodiments of the present disclosure.

FIG. 2 illustrates a general flow diagram for inferring the most probable cause from observable outcomes according to embodiments of the present disclosure. In step 205, one or more observed outcomes F are received. In embodiments, the observed outcomes may be diseases-related symptoms. In embodiments, in step 210, the outcomes indices corresponding to the input symptoms are obtained. In embodiments, the indices may be obtained from a pre-assigned index of the outcomes. The indices may be assigned according to one or more of a number of factors including, but not limited to, the outcomes' natural frequency order, expert-labeled order, knowledge graphs, machine-learning derived order, etc.

In step 215, in embodiments, the ordered outcomes are divided into a first set of outcomes and a second set of outcomes based on the indices. The first set of outcomes may be associated with indices that indicate outcomes that are well suited for variational inference, such as outcomes that are less important, and the second set of outcomes may be associated with indices that indicate outcomes that are well suited for exact inference, such as outcomes that are more important. In some embodiments, the outcomes F may comprising positive outcomes (F+) and negative outcomes (F−). In some embodiments, the negative outcomes (F−) always have the low order index and always part of the first (exactly inferred) set.

For example, in embodiments, the outcomes may be ordered according to assigned index, and a threshold value may be set that divides the ordered outcomes into the first and second sets. For example, the observed outcomes with lower indices (e.g., the first set of outcomes, $F_1$) are assigned for variational inference while observed outcomes with higher indices (the second set of outcomes, $F_2$) are assigned for exact inference. It shall be noted that depending upon how the index is configured, it may be that outcomes with lower indices correspond to the outcomes that are better suited for exact inference and the outcomes with the high indices are better suited for variational inference. It shall also be noted that, in embodiments, not all of the outcomes may be included in one of the sets. For example, some of the least important outcomes may be discarded rather than included in the variational inference set of outcomes. In embodiments, the threshold for dividing the outcomes into the variational inference group and the exact inference group may be based upon a balancing of computational cost versus accuracy, in which having more outcomes included in the exact inference group increases accuracy but also increases the computation cost.

It shall be noted that previous attempts at Noisy-OR inference did not use outcome ordering. Without using an outcome index, choosing exact or variational inference has previously been a very computationally expensive decision. Thus, embodiments of the present document that comprises using an assigned index to help divide outcomes into exact and variational inference groups has may benefits. First, it makes the computation process faster. Second, the probable cause can be inferred faster than a strictly exact inference and more accurately than a strictly variational inference. Also, embodiments provide robustness; for example, in cases of imperfect outcome observations, inferences using an embodiment of the present disclosure will be more accurate than ones that use strictly exact inference. One skilled in the art shall recognize other benefits as well.

In step 220, the sets of observed outcomes are used in exact inference and variational inference according to their groups. For example, the first set with lower indices is used in an exact inference while the second set of observed outcomes with higher indices used in in a variational inference. Both exact inference and variational inference have been used in modern statistics and logic reasoning. Variational inference has been used to approximate posterior distributions for Bayesian models as an alternative method to Markov Chain Monte Carlo sampling. Variational inference has been applied to problems such as large-scale data analysis, neuroscience, etc. In embodiments, both exact inference and variational inference may be implemented with different algorithms. For example, methods including but not limited to convex conjugate minimization and loopy propagation may be used for variational inference. As discussed in more detail below, it shall be noted that depending upon the implementation, the variational or exact inference process may also comprise combining the exact or variational inference, respectively. In embodiments, negative inferences may also be included in the calculation for the most probable cause(s).

Embodiment 1—Variational Inference and then Exact Inference

In embodiments, the variational inference process may be used to calculate a posterior, which is used in an exact inference process. Consider, by way of example, the following:

posterior=$p(d_i|F_1^+)$, in which a variational inference method is used to infer the probability of disease $d_i$ ($d_i$ represents the ith disease) given a first set of positive outcomes, $F_1^+$, that have been identified via the assigned indexing as discussed above.

In embodiments, the posterior of the variational inference process may be used as an input to an exact inference. Consider, by way of example, the following:

$p(d_i|F_2^+,\text{posterior},F^-)$, in which an exact inference method is used to infer the probability of disease $d_i$ given a second set of positive outcomes, $F_2^+$, that have been identified via the assigned indexing as discussed above, the posterior from the variational inference, and a set of negative observation, $F^-$.

It should be noted that, in embodiments, the obtained observations may be categorized as positive observables and negative observables ($F^+$ and $F^-$, respectively). A positive observation is the affirmative observation of an outcome. Examples of positive observations may be diseases-related symptoms, in the case of a medical context, or a falling stock price in the case of a stock market context. A negative observation is the confirmation of not observing something (instead of the ignorance of that something). The observation of an alarm NOT being triggered or the observation that a patient does NOT have a fever (i.e., has a normal temperature) are examples of negative observations. In embodiments, only the positive observations are indexed and divided into two sets—one set for variational inference and one set for exact inference.

Embodiment 2—Exact Inference and then Variational Inference

In embodiments, an exact inference process may be used to calculate a posterior, which is used in a variational inference process. Consider, by way of example, the following:

posterior=$p(d_i|F_2^+,F^-)$, in which an exact inference method is used to infer the probability of disease $d_i$ given a second set of positive outcomes, $F_2^+$, and a set of negative outcomes, $F^-$.

In embodiments, the posterior of the exact inference may be used as an input to a variational inference. Consider, by way of example, the following:

$p(d_i|F_1^+,\text{posterior})$, in which a variable inference method is used to infer the probability of disease $d_i$ given a first set of positive outcomes, $F_1^+$, that have been identified via the assigned indexing as discussed above and the posterior from the exact inference.

In embodiments, in step 225, results of the inference process are used to output the most probable cause or causes. In the example given above, the most probable cause or causes would be those diseases that have the highest inferred probabilities.

In embodiments, this step of outputting the likely causes comprises outputting those causes with probabilities that are above a threshold inferred probability value (which may, in embodiment, comprise selecting a single cause with the highest probability as the most probable cause). In embodiments, the threshold probability value may be chosen to be a statistical confidence level. The unique combination of exact inference and variational inference according to outcome indices makes the probable cause inferring faster, saving computationally expensive decision for choosing exact or variational inference for the outcomes, and is potentially more robust.

In embodiments, in step 230, the indices of the observed outcomes may be updated based on results of exact inference and variational inference. In embodiments, a machine learning model may be used to improve the indexing. For example, based on large amount of sets of randomly selected observed outcomes, the error margin between exact inference and variational inference is compared for each set. A predictor may then be trained to predict from outcome index to its error margin. The predicted error margin may be used to rank order index.

Figure 3:
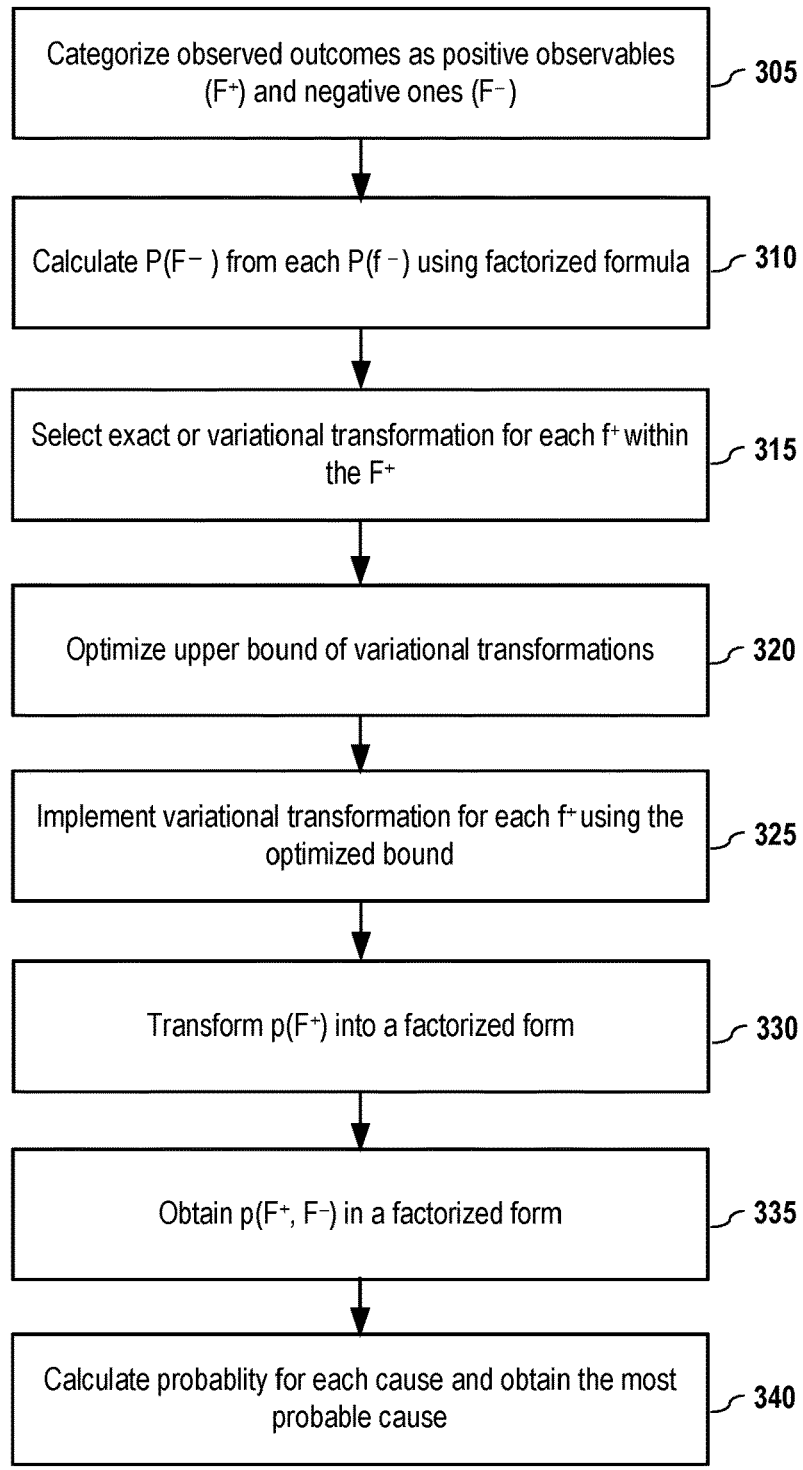
FIG. 3 illustrates an exemplary flow diagram for inferring the most probable cause using factorized probabilities function according to embodiments of the present disclosure.

FIG. 3 illustrates an exemplary flow diagram for inferring the most probable cause using positive observables and negative observables according to embodiments of the present disclosure. In step 305, the obtained observations are categorized as positive observables and negative observables ($F^+$ and $F^-$, respectively).

The probability (posterior probability) of $d_i$ causing $F^+$ and $F^-$ for an exact inference process can be expressed as:

$$p(d_i|F^+,F^-) = \frac{p(d_i, F^+, F^-)}{p(F^+, F^-)} \qquad (1)$$

where $F^+=\{f_1^+, f_2^+, \ldots\}$, $F^-=\{f_1^-, f_2^-, \ldots\}$ and $d_i$ represents the ith disease.

The positive observables comprise one or more observations (e.g., $f_1^+, f_2^+ \ldots$), while the negative observations comprise one or more negative observations (e.g., $f_1^-, f_2^- \ldots$). The desired goal is to ascertain the most probable cause or causes among all the causes.

In embodiments, the positive observables are divided into at least two groups with one group being assigned to variational inference and the other group being assigned to exact inferenced. In embodiments, the process for forming the two groups may be performed as discussed above with respect to FIG. 2 using an assigned index. For example, $F^+$ may be expressed as $F^+=F_1^+\cup F_2^+$, where $F_1^+$ are positive observables designated for variational inference, and $F_2^+$ are positive observables designated for exact inference. In embodiments, $F_1^+\cap F_2^+=\emptyset$.

In step 310, the probability $p(F-)$ of negative observables are transformed into a factorized form by applying single negative outcome probabilities to a joint probability of multiple negative outcomes.

For a single negative outcome, the outcome probability may be expressed as:

$$p(f^-) = \sum_{D_k \in D}\left[\prod_{d \in D_k^+} p(f^- \mid only\ d)\prod_{d \in D_k^+} p(d^+)\prod_{d \in D_{\bar{k}}^-} p(d^-)\right] \quad (2)$$

Equation (2) may also be expressed as:

$$p(f^-) = \prod_{i=1}^n [p(f^- \mid only\ d_i)p(d_i^+) + p(d_i^-)] \quad (3)$$

Based on single negative outcome probabilities, the joint probability of multiple negative outcomes may be expressed as:

$$p(F^-) = \prod_{i=1}^n \left(\left[\prod_{f \in F^-} p(f^- \mid only\ d_i)\right]p(d_i^+) + p(d_i^-)\right) \quad (4)$$

In step 315, proper transformation is selected for each $f^+$ within the $F^+$. The process illustrated in FIG. 2 may be incorporated here. Each $f^+$ may be assigned a pre-assigned index and be treated according to its assigned index. In some embodiments, the $f^+$ is omitted from further calculation if it is indexed as most likely false, or is kept for variational transformation if it is indexed as likely to be false, or is kept for exact inference if it is indexed as unlikely to be false.

For variational inference, the posterior probability of $d_i$ maybe expressed as $p(d_i|F_1^+)$ and the posterior probability for exact inference may be given by $p(d_i|F_2^+,p(d_i|F_1^+),F^-)$ or $p(d_i|F^+,F^-)$. In an alternatively embodiment, the posterior probability of $d_i$ for exact inference may be given by $p(d_i|F_2^+,F^-)$, while the posterior probability of $d_i$ for variational inference is given by $p(d_i|F_1^+,p(d_i|F_2^+,F^-))$.

In some embodiments, the $p(f^+)$ may be obtained by:

$$p(f^+)=1-p(f^-)\le -\xi\cdot p(f^-)\cdot g^*(\xi) \quad (5)$$

In step 320, the upper bound of variational transformation for $p(f^+)$ is optimized. In embodiments, the optimization process comprises the following steps:

(1) Transforming the $1-p(f^-)$ as a concave function (or log-concave) $g(\ )$ and use the conjugate $g^*(\ )$ as upper bound of the variational transformation. The conjugate $g^*(\ )$ is convex with respect to a function $\xi$.

(2) Optimizing $\xi$: $\xi$ is a variational parameter that guarantees the conjugate $g^*(\ )$ is always an upper bound of $g(\ )$. For a fixed x, there exists a unique $\xi$ such that $g^*(\xi)$ achieves its minimum, $g(x)$. Considering the convex problem of $\xi$ is not decomposable with respect to n and not analytically solvable, the variational evidence $-\xi\cdot p(f^-)\cdot g^*(\xi)$ is further relaxed to obtain analytical solution and to gain processing speed. In some embodiments, typical second order optimizers (such as Newton's method) can solve for $\xi$.

In step 325, variational transformation for each $f^+$ is implemented using the optimized upper bound.

In step 330, the joint probability $p(F+)$ of all positive observables selected for variational inference are transformed into a factorized form. In embodiments, the joint probability of multiple positive outcomes may be calculated from the negative outcome probability of each of the outcomes in the joint probability, expressed as:

$$p(F^+) = \sum_{F' \in 2^{F^+}} (-1)^{|F'|} \prod_{i=1}^n \left(\left[\prod_{f \in F'} p(f^- \mid only\ d_i)\right]p(d_i^+) + p(d_i^-)\right) \quad (6)$$

In step 335, the joint probability of both positive and negative outcomes is obtained as:

$$p(F^+, F^-) = \sum_{F' \in 2^{F^+}} (-1)^{|F'|} \prod_{i=1}^n \left(\left[\prod_{f \in F' \cup F^-} p(f^- \mid only\ d_i)\right]p(d_i^+) + p(d_i^-)\right) \quad (7)$$

Equation (7) is the denominator of equation (1). Regarding the numerator in equation (1), it is trivial to derive the numerator from this form of the denominator. Function $p(F^+,F^-)$ has temporal complexity of $O(n|F^-|2^{|F^+|})$. The factorization of $p(F^+)$ in a similar way as $p(F^-)$ reduces computational cost of $p(F^+,F^-)$ and thus provides a quick response time.

In step 340, probability of each cause is calculated based on the obtained joint probability of both positive and negative outcomes. The cause with the highest probability may then be chosen as most probable cause.

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 4:
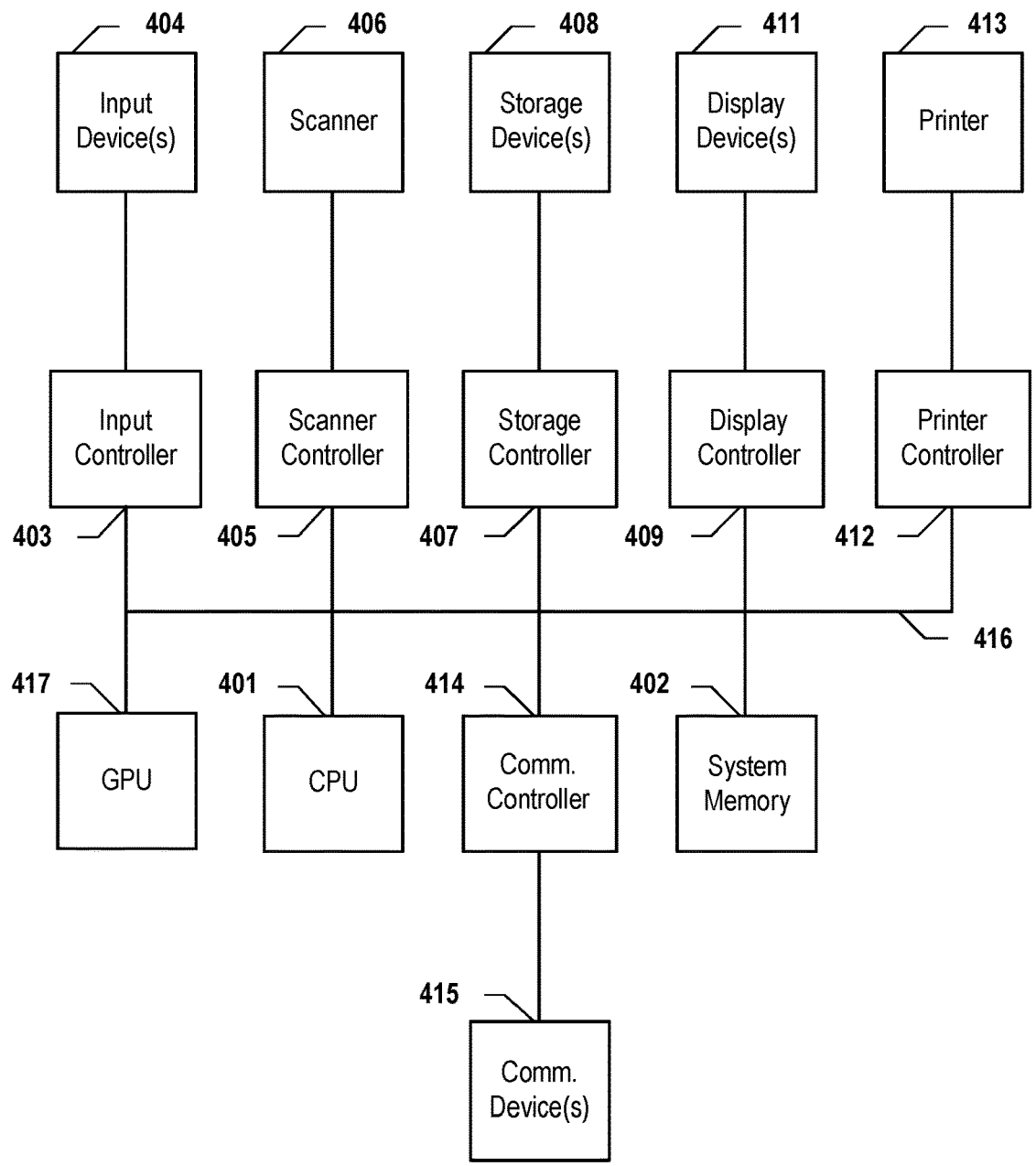
FIG. 4 depicts a simplified block diagram of a computing device/information handling system, in accordance with embodiments of the present disclosure.

FIG. 4 depicts a block diagram of a computing system 400 according to embodiments of the present invention. It will be understood that the functionalities shown for system 400 may operate to support various embodiments of a computing system—although it shall be understood that a computing system may be differently configured and include different components. As illustrated in FIG. 4, system 400 includes one or more central processing units (CPU) 401 that provides computing resources and controls the computer. CPU 401 may be implemented with a microprocessor or the like, and may also include one or more graphics processing units (GPU) 417 and/or a floating point coprocessor for mathematical computations. System 400 may also include a system memory 402, which may be in the form of random-access memory (RAM), read-only memory (ROM), or both.

A number of controllers and peripheral devices may also be provided, as shown in FIG. 4. An input controller 403 represents an interface to various input device(s) 404, such as a keyboard, mouse, or stylus. There may also be a scanner controller 405, which communicates with a scanner 406. System 400 may also include a storage controller 407 for interfacing with one or more storage devices 408 each of which includes a storage medium such as magnetic tape or disk, or an optical medium that might be used to record programs of instructions for operating systems, utilities, and applications, which may include embodiments of programs that implement various aspects of the present invention. Storage device(s) 408 may also be used to store processed data or data to be processed in accordance with the invention. System 400 may also include a display controller 409 for providing an interface to a display device 411, which may be a cathode ray tube (CRT), a thin film transistor (TFT) display, or other type of display. The computing system 400 may also include a printer controller 412 for communicating with a printer 413. A communications controller 414 may interface with one or more communication devices 415, which enables system 400 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 416, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

It should be understood that various system components may or may not be in physical proximity to one another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It shall be noted that elements of the claims, below, may be arranged differently including having multiple dependencies, configurations, and combinations. For example, in embodiments, the subject matter of various claims may be combined with other claims.

The invention claimed is:

1. A computer-implemented method for determining a set of probable causes from a set of observed outcomes, the method comprising:
   obtaining the set of observed outcomes comprising one or more positive observed outcomes;
   ordering at least some of the positive observed outcomes from the set of observed outcomes according to a pre-assigned index, in which each positive observed outcome of the at least some of the positive observed outcomes has an associated pre-assigned index;
   dividing the ordered positive observed outcomes into a first set of outcomes and a second set of outcomes based on the ordering;
   determining an inferred probability for each cause of a set of causes using both the first set of outcomes and the second set of outcomes, in which the first set of outcomes is used in a variational inference process and the second set of outcomes is used in an exact inference process;
   outputting the set of probable causes comprising the causes with inferred probabilities above a threshold probability value.

2. The method of claim 1 wherein the ordering step further comprises:
   removing one or more of the observed outcomes from the set of observed outcomes, based on a low level of importance indicated by the pre-assigned index.

3. The method of claim 1 wherein the pre-assigned index value for at least one of the observed outcomes in the set of observed outcomes is based upon a natural frequency of occurrence.

4. The method of claim 1 wherein the pre-assigned indexing is based upon a labeled ordering.

5. The method of claim 1 wherein the pre-assigned index for at least one of the observed outcomes in the set of observed outcomes is based on a machine learning-derived order.

6. The method of claim 1, further comprising inferring a most probable one of the set of probable causes based on a highest probability of the inferred probabilities.

7. The method of claim 1 further comprising updating the ordering using ground truth and machine learning.

8. The method of claim 1 wherein the variational inference process is implemented using convex conjugate minimization or loopy propagation.

9. The method of claim 1 wherein the exact inference process is implemented using quick score, singly-coupled pair elimination, or quartet test.

10. A method for determining potential causes from multiple sufficient outcomes, the method comprising:
    obtaining a set of observables comprising positive observables and negative observables, the negative observables being confirmations of not observing, the set of observations being related with a set of potential causes;
    determining a single negative observable probability for each negative observable;
    applying each single negative observable probability to determine a first joint probability of the negative observables;
    dividing at least some of the positive observables into a first group and a second group based on pre-set index values, in which each positive observable of the at least some positive observables has an associated pre-set index;
    selecting exact inference for the positive observables of the first group and variational inference for the positive observables of the second group;
    determining a probability of each of the positive observables of the second group, which was selected for variational inference using variational transformation;
    determining a second joint probability of the positive observables of the second group, which were selected for variational inference;
    determining a third joint probability of the set of observables using the second joint probability of the second group of positive observables and the first joint probability of the negative observables; and
    determining an inferred probability for each cause of the set of potential causes using the third joint probability of the set of observables.

11. The method of claim 10 further comprises filtering out one or more of the positive observables based on the pre-set index.

12. The method of claim 10 further comprises optimizing an upper bound for the variational transformation before implementing the variational transformation.

13. The method of claim 12 wherein optimizing the upper bound comprises:
    transforming a probability function of each of the second group of positive observables selected for variational transformation as a concave function; and
    using a conjugate function of the concave function as the upper bound.

14. The method of claim 10 further comprising inferring a most probable cause of the set of potential causes based on a highest probability of the inferred probabilities.

15. The method of claim 10 wherein the variational inference transformation is implemented using convex conjugate minimization or loopy propagation.

16. The method of claim 10 wherein the single negative observable probability for each negative observable is transformed into a factorized form using an exact transformation.

17. A non-transitory computer-readable medium or media comprising one or more sequences of instructions which, when executed by one or more processors, causes the steps to be performed comprising:
    receiving a set of observables and an index for ordering each observable of the set of observables, the set of observables being related to a set of possible causes;
    dividing the set of observables into a first set of observables and a second set of observables based on the index to each observable of the set of observables;
    calculating a probability for each cause of the set of possible causes based upon both the first set of observables and the second set of observables, in which the observables of the first set are used in a variational inference and the observables of the second set are used in an exact inference; and
    inferring a most probable cause from the set of possible causes based on a highest calculated probability.

18. The non-transitory computer-readable medium or media of claim 17 wherein the set of observables comprises positive observables and negative observables, the negative observables being the confirmations of not observing.

19. The non-transitory computer-readable medium or media of claim 18, wherein the negative observables are used for the exact inference.

20. The non-transitory computer-readable medium or media of claim 18, wherein a positive observable is omitted from calculation, used for the exact inference, or used for the variational inference based on the index assigned to it.

* * * * *